US008887262B1

(12) United States Patent
Turner et al.

(10) Patent No.: US 8,887,262 B1
(45) Date of Patent: Nov. 11, 2014

(54) CONFIGURING A COMPUTING DEVICE

(71) Applicant: Amplify Education, Inc., New York, NY (US)

(72) Inventors: Steven Turner, Richmond Hill (CA); Sean P. Farrell, Brooklyn, NY (US)

(73) Assignee: Amplify Education, Inc., New York, NY (US)

( * ) Notice: Subject to any disclaimer, the term of this patent is extended or adjusted under 35 U.S.C. 154(b) by 0 days.

(21) Appl. No.: 14/100,142

(22) Filed: Dec. 9, 2013

Related U.S. Application Data

(60) Provisional application No. 61/790,712, filed on Mar. 15, 2013.

(51) Int. Cl.
*G06F 21/00* (2013.01)
*G06F 21/35* (2013.01)
*H04L 29/06* (2006.01)

(52) U.S. Cl.
CPC ............ *G06F 21/35* (2013.01); *H04L 63/0853* (2013.01)
USPC ............................................ 726/10; 709/220

(58) Field of Classification Search
None
See application file for complete search history.

(56) References Cited

U.S. PATENT DOCUMENTS

| | | | |
|---|---|---|---|
| 2009/0108057 A1* | 4/2009 | Mu et al. ........................ | 235/375 |
| 2011/0264527 A1* | 10/2011 | Fitzpatrick et al. ......... | 705/14.55 |
| 2012/0158919 A1* | 6/2012 | Aggarwal et al. ............. | 709/220 |
| 2012/0188112 A1* | 7/2012 | Beals et al. .................... | 341/176 |
| 2012/0254768 A1* | 10/2012 | Aggarwal et al. ............. | 715/744 |
| 2013/0198004 A1* | 8/2013 | Bradley et al. ............. | 705/14.64 |
| 2013/0262309 A1* | 10/2013 | Gadotti ........................... | 705/44 |
| 2014/0034726 A1* | 2/2014 | Cepuran ........................ | 235/380 |

OTHER PUBLICATIONS

Lisa, S. et al., Use of 2D barcode to access multimedia content and the web from a mobile handset, 2008, Telecommunications Conference 2008, 3 pages.*

* cited by examiner

*Primary Examiner* — Farid Homayounmehr
*Assistant Examiner* — Maung Lwin
(74) *Attorney, Agent, or Firm* — Fish & Richardson P.C.

(57) ABSTRACT

A Quick Recognition (QR) code scanner is activated on a computing device. A user specific QR code is scanned using the QR code scanner. User specific data that is encoded in the QR code is extracted from the scanned QR code. The computing device is configured to access a local area network based on the user specific data extracted from the scanned QR code. The computing device is register, over the local area network, with a server using the user specific data extracted from the scanned QR code. User specific configuration information is received at the computing device from the server. The computing device is configured using the received configuration information.

30 Claims, 4 Drawing Sheets

CONFIGURING A COMPUTING DEVICE

CROSS REFERENCE TO RELATED APPLICATIONS

This application claims the benefit of U.S. Patent Application Ser. No. 61/790,712, filed Mar. 15, 2013, and titled "CONFIGURING A COMPUTING DEVICE," which is incorporated herein by reference in its entirety.

TECHNICAL FIELD

This specification relates to configuring a computing device.

BACKGROUND

In certain circumstances, computing devices may need to be configured specifically for an intended user and/or environment.

SUMMARY

In an aspect, a Quick Recognition (QR) code scanner is activated on a computing device. A user specific QR code is scanned using the QR code scanner. User specific data that is encoded in the QR code is extracted from the scanned QR code. The computing device is configured to access a local area network based on the user specific data extracted from the scanned QR code. The computing device is register, over the local area network, with a server using the user specific data extracted from the scanned QR code. User specific configuration information is received at the computing device from the server. The computing device is configured using the received configuration information.

Implementations can include one or more of the following features. For example, the user specific data may include at least one of: user identifier, network authentication credentials, or a user's authentication credentials. Activating the QR code scanner on the computing device may be performed to the exclusion of all other applications on the computing device. The computing device may be a tablet computer. The computing device may be programmed to aid in educational instruction.

Configuring the computing device using the received configuration information may include removing content from the computing device that was loaded on the computing device prior to scanning the QR code, and the content to be removed may be determined from the received user specific configuration information. Configuring the computing device using the received configuration information may include loading content on the computing device, and the content may be determined from the received user specific configuration information. Configuring the computing device using the received configuration information may include setting policies on the computing device based on the received user specific configuration information.

Registering the computing device with the server may include: displaying a user login page on the computing device, displaying a username and password in a separate panel overlaid on the login page, prompting the user to copy the username and password into the user login page, sending the entered username and password to an authentication server, receiving a token indicating the user's username and password were authenticated by the authentication server from the authentication server indicating, and associating the computing device with user specific configuration information for the user.

User specific data may be accessed for a plurality of users, the user specific data associated with an individual user may be selected from the plurality of users, and the user specific QR code encoding the user specific data for the individual user may be generated. The QR code may be printed on a card and the printed card may be distributed with the computing device to the individual user. The QR code encoding the user specific data may be generated with a second computing device, the QR code may be displayed on a display of the second computing device, and scanning the QR code may include scanning the QR code displayed on the display of the second computing device using the QR scanner.

Implementations of the described techniques may include a system, a method or process, a device, or computer software on a computer-readable storage medium.

Advantages can include one or more of the following: simplifying the customization and provisioning process for computing devices, reducing the workload of information technology staff, or reducing manufacturers' manufacturing costs.

The details of one or more implementation of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
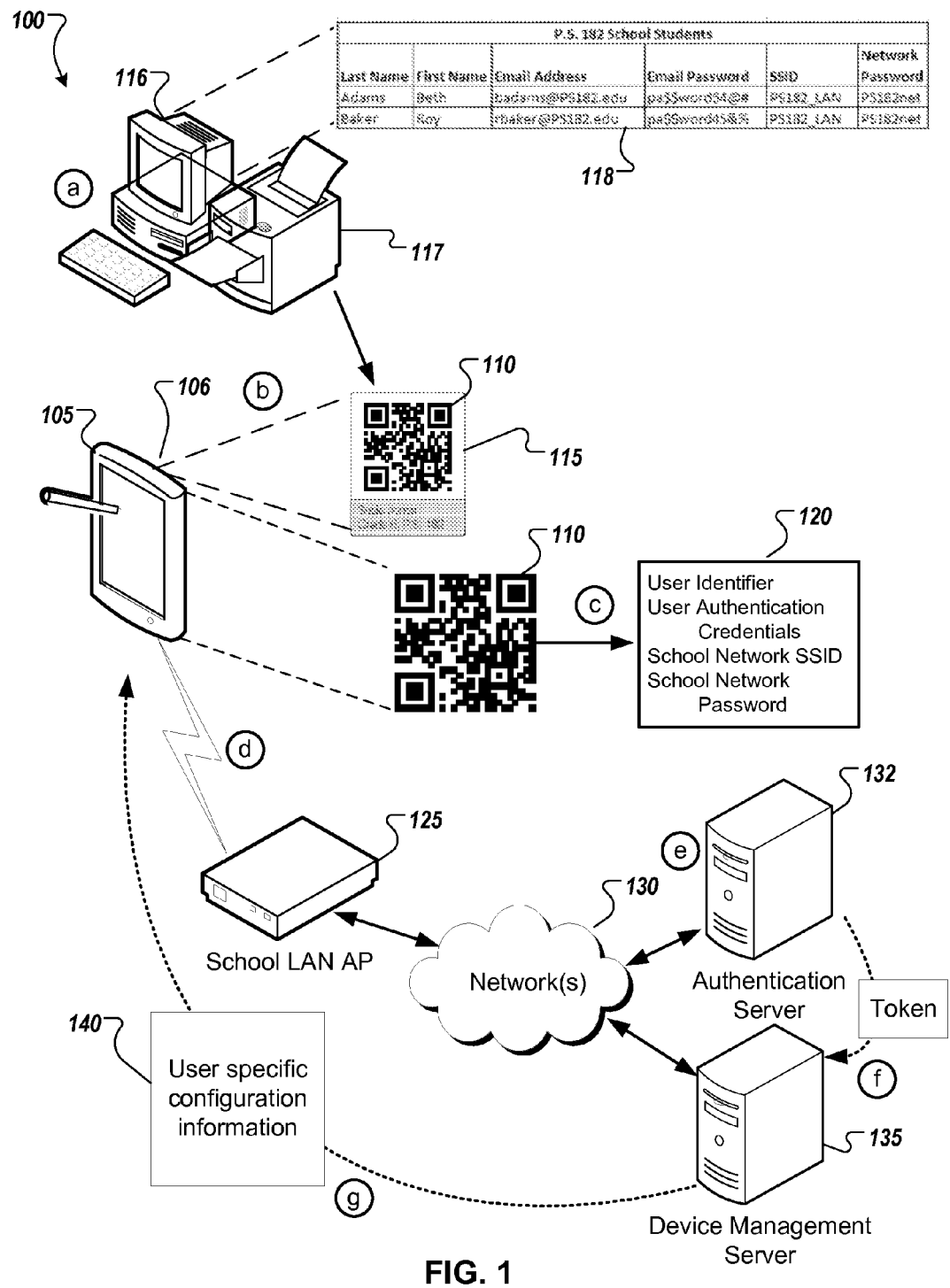
FIG. 1 is a diagram showing an example of a system that allows a computing device to be configured using a user specific QR Code®.

FIG. 1 is a diagram showing an example of a system 100 that allows a computing device 105 to be configured using a user specific QR Code® 110. FIG. 1 also illustrates the data flow within the system 100 during states (a) to (g). Briefly, the system 100 includes a computing device 105 that uses data encoded in a QR Code® to connect to a server through local area network (LAN access point and customize the configuration of the computing device for a particular user. For example, the data encoded in the QR Code® may be user specific data enabling the computing device to configure access to the internet through a LAN access point and download user specific configuration information with minimal user interaction. In some cases, system 100 may be used to efficiently configure and customize a large number of individual computing devices in a classroom or other similar environment.

In more detail, the system 100 includes computing device 105 having a camera 106 and a QR Code® scanner. The camera 106 and QR Code® scanner are configured to scan and decode a QR Code® 110. Once configured, the computing device 105 may be in communication with device management server 135 and email server 132 through LAN access point 125 and over one or more networks 130. The QR Code® card 115 and user specific QR Code® 110 is generated from a spreadsheet 118 using computer 116 and printer 117. In general, the following description uses the example of configuring computing device 105 for a use by a student or teacher in a school setting with applications customized to the student's or teacher's class schedule. The states (a) to (g) depict a data flow that occurs when an example process is performed by the system 100.

Computing device 105 may be, for example, a tablet computer, a smartphone, or a laptop computer. The computing device includes camera 106 or other optical device configured to scan a QR Code®. In some cases, the computing device 105 is provided to a new user in a default state in which the device has not yet been configured for a specific user and contains no previous user specific data. For example, the device may never have been used or may have been previously reset to its unused default condition. The computing device's 105 default condition may include preloaded content, for example, documents or applications which may be useful to any student attending school. In some implementations, a manufacturer may initially provision every computing device 105 with content that may be applicable to some but not all students and teachers, for example using a common content bundle for all devices. For example, the content might be electronic textbooks, documents, notebooks, multimedia, or applications related to all classes taught at a school or any subset of such content. A user may customize the computing device's 105 configuration from such a default state by scanning a QR Code® 110, as described below. A custom configuration may include, for example, connecting to a wireless network, setting device permissions, deleting preloaded content, loading additional content, or any combination of these actions.

User specific QR Code® card 115 is a printed card containing a user specific QR Code® 110 and text identifying the student. The card 115 may include, for example, the student's first and last name, the student's grade (e.g. First Grade, Second Grade, etc.), and the school's name or a school logo. The QR Code® 110 encodes various user specific data such as, for example, the student's first and last name, the service set identification (SSID) for the school's wireless network, the school's network password, an e-mail address for the student, and an e-mail password.

LAN access point 125 is a wireless access point configured to allow users to connect to network(s) 130, for example a WI-FI access point. Networks(s) 130 may include a local network with access to other wide area networks, for example a school's LAN providing access to the internet. The LAN access point 125 provides users with access through network(s) 130 to authentication server 132 and device management server 135.

Authentication server 132 and device management server 135 may be one or more computer devices in communication with network(s) 130. Authentication server 132 may be used to authenticate a user's identity from user authentication credentials (e.g. a username or e-mail address and password) and to send an authentication indication, such as a token, to device management server 135. In some implementations, authentication server 132 is an e-mail server. Device management server 135 may be used to associate specific computing devices 105 with specific users, identify specific device configuration settings associated with individual users, and provide configuration or content updates. For example, the device management server may identify user specific information through access to a third-party Student Information System (SIS) integration system, such as Clever.

Computer 116 is in communication with printer 117 and used to create QR Code® cards 115. Computer 116 may be a laptop computer, desktop computer, or tablet computer and is used to run a QR Code® generating application. QR Code® generating application may be web-based or installed on computer 116. The application receives a electronic data file 118 (e.g. a CSV or XML file) detailing user information as input and generates user specific QR Code®s 110 based on the information contained in the electronic data file 118. Computer 116 may generally be used by school staff, such as administrators, or IT staff to prepare QR Code® cards 115 to be distributed to students and teachers with their individual computing devices 105.

The process illustrated in FIG. 1 shows a more particular example of the system's 100 operation. In this example, computer 116 generates user specific QR Codes® by encoding user information from an electronic data file 118 and printing the QR Codes® 110 on individual QR Code® cards 115. The QR Code® cards 115 are distributed with the computing devices 105 to the intended users. In general, the computing device 105 initializes a QR scanner when powered on by the intended user or someone helping the intended user, and the intended user or helper can scan the QR Code® card 115 using the QR scanner, which extracts user specific information from the scanned QR Code®. The computing device 105 uses the user's 102 user specific data 120 encoded in the QR Code® 110 to access a network 125 after which the computing device 105 registers with a server 132. The server 132 then communicates user specific configuration information 140 to the computing device 105 which uses the information 140 to customize the settings, content, and applications on the computing device 105 for the student.

In more detail, during state (a), a teacher, school administrator, or IT staff member creates QR Code® cards 115 using a QR Code® card generating application on computer 116. The QR Code® card generating application loads an electronic data file containing user specific data for a plurality of users and identifies the user specific data associated with individual users. The application may encrypt the user specific data before encoding it in a QR Code®. A second electronic data file is generated by the application including QR Codes® 110 for each user listed on the electronic data file loaded into the application. The QR Codes® 110 may, for example be included on a QR Code® card 115 along with additional information identifying the user. QR Code® cards 115 may then be printed from the second electronic data file. In some implementations, each QR Code® card 115 may be generated on a separate sheet in the second electronic data file. For example, if the electronic data file that was loaded into the application contained data for 100 users then the output electronic data file would contain 100 sheets; one for each user's QR Code® card.

During state (b), the student (or someone helping the student) scans the QR Code® 110 using the camera 106 on the computing device 105. The computing device 105 then processes the QR Code® 110. When a student powers on the computing device 105 the QR scanner may be automatically launched if the device is in a default configuration (either new or reset). In other implementations, the device 105 may launch a welcome page when it is powered on which provides the student with an option to configure the device either manually or to launch the QR scanner. In some implementations the scanner or welcome page is launched to the exclusion of other applications. The QR scanner will use the computing device's 105 camera 106 to display an image of the QR Code® card 115 on the device's display as the student holds the device over card 115. A prompt may be used to indicate that the student should center the QR code 110 in the device's display, for example a box or a bracket centered in the display. The QR Code® scanner may recognize and scan the QR Code® 110 once it is centered in the display.

During state (c), the computing device 105 decodes the user specific data 120 from the scanned QR Code® 110. The user specific data 120 may include a user identifier and user authentication credentials for the student, a service set identification (SSID) for the school's wireless network, and the school's network password. For example, the user identification may be the student's first and last name and the user authentication credentials may be a user name and password. The username may be an e-mail address, for example. In some implementations, the user specific data 120 may be encrypted and the QR scanner will use a unique decryption key to decrypt the user specific data 120.

During state (d), the computing device 105 is configured to access wireless LAN access point 125. The computing device 105 may use any appropriate network credentials to configure access to the wireless LAN access point 125, for example, an SSID and network password, an electronic certificate, or 802.1x credentials. Once access to the wireless LAN access point 125 has been configured the computing device 105 accesses network(s) 130.

During state (e), the computing device 105 communicates with authentication server 132 through the LAN access point 125 and over network(s) 130. Computing device 105 displays a user login application for the authentication server 132. In some implementations, the computing device 105 prompts the student to login to the authentication server 132 and, in addition to the login page, displays floating application with the student's 102 authentication credentials, for example an e-mail address and password. The box may be overlaid on the login application and may allow the student to cut and paste the e-mail address and password into the login application, for example. Authentication server 132 will verify the student's 102 e-mail and password.

During state (f), authentication server 132 sends a token to device management server 135 indicating that the student was successfully authenticated. The computing device 105 may then communicate with device management server 135 to register and receive configuration information. Device management server 120 registers the computing device 105 by recording a unique device identifier, such as a serial number, in association with some or all of the student's user specific data. In some implementations, the computing device's unique identifier is associated with the student using the student's first and last name, e-mail address, or all three. In addition, the device management server 135 identifies user specific configuration information 140 for the student. The user specific configuration information 140 includes, for example, electronic textbooks, notebooks, and applications based on courses in which the student is enrolled, and security provisions specified by the student's school. In some implementations, the device management server 135 may obtain the student's course schedule through the student information system.

During state (g), device management server 135 communicates the student's user specific configuration information 140 to the computing device 105. Computing device 105 configures itself for the student 120 in accordance with the user specific configuration information 140. For example, configuring the computing device 105 may include downloading course specific electronic textbooks, notebooks, applications, or other content; such as a chemistry textbook and a periodic table application, for example. In addition, configuring the computing device 105 may also include removing preloaded content that is not applicable to the particular student. Furthermore, configuring the computing device 105 may include customizing device policies, such as device permissions or settings, for example, security settings, password policy, VPN settings, delegation as a teacher or student, or web browsing permissions.

In some implementations, computing device may be preloaded with user content that is applicable to some students and teachers but not all. For example, a manufacturer may initially provision every computing device 105 with content that may be applicable to some but not all students and teachers in a given school district, or across school districts, for example using a common disk image for all devices. Configuring, in such implementations, may include removing unneeded applications or content which was preloaded on the computing device 105. This implementation may helpful be in reducing manufacturing costs by eliminating a manufacturer's need for multiple customized image disks and also reduce the amount of data a user would be required to download during initial device setup.

In some implementations, a teacher may be able to regenerate a student's QR Code® 110 on the display of the teacher's own computing device 105, for example, to configure a loaner computing device 105 in the event a student forgets to bring their computing device 105 to class or loses it. For example, a QR Code® generating application may be installed on a teacher's computing device 105 and include an option to create a single QR Code® 110 for a student. The created QR Code® 110 then may be displayed on the display screen of the teacher's computing device's 105. A student desiring to configure a second computing device 105 may then simply scan the QR Code® 110 generated and displayed on the teacher's computing device 105 without the need to print a QR Code® card 115. The teacher may be required to enter some or all of the student's user specific data 120 into the application in order to generate the QR Code® 110. Some implementations may allow the teacher to select the student on the teacher's computing device 105 and generate the QR Code® 110 using data stored on the device management server 135. Other implementations may request that the student enter their login credentials on the teacher's computing device 105, for instance, before the application will generate the student's QR Code®. Because the student had already registered a previous computing device 105, other data required to generate a QR Code® may be accessed from the device management server 135 by the QR Code® generating application. Once the student scans the QR Code® 110 displayed on the teacher's computing device 105 with the loaner computing device 105, the loaner is configured through the process described above.

Figure 2:
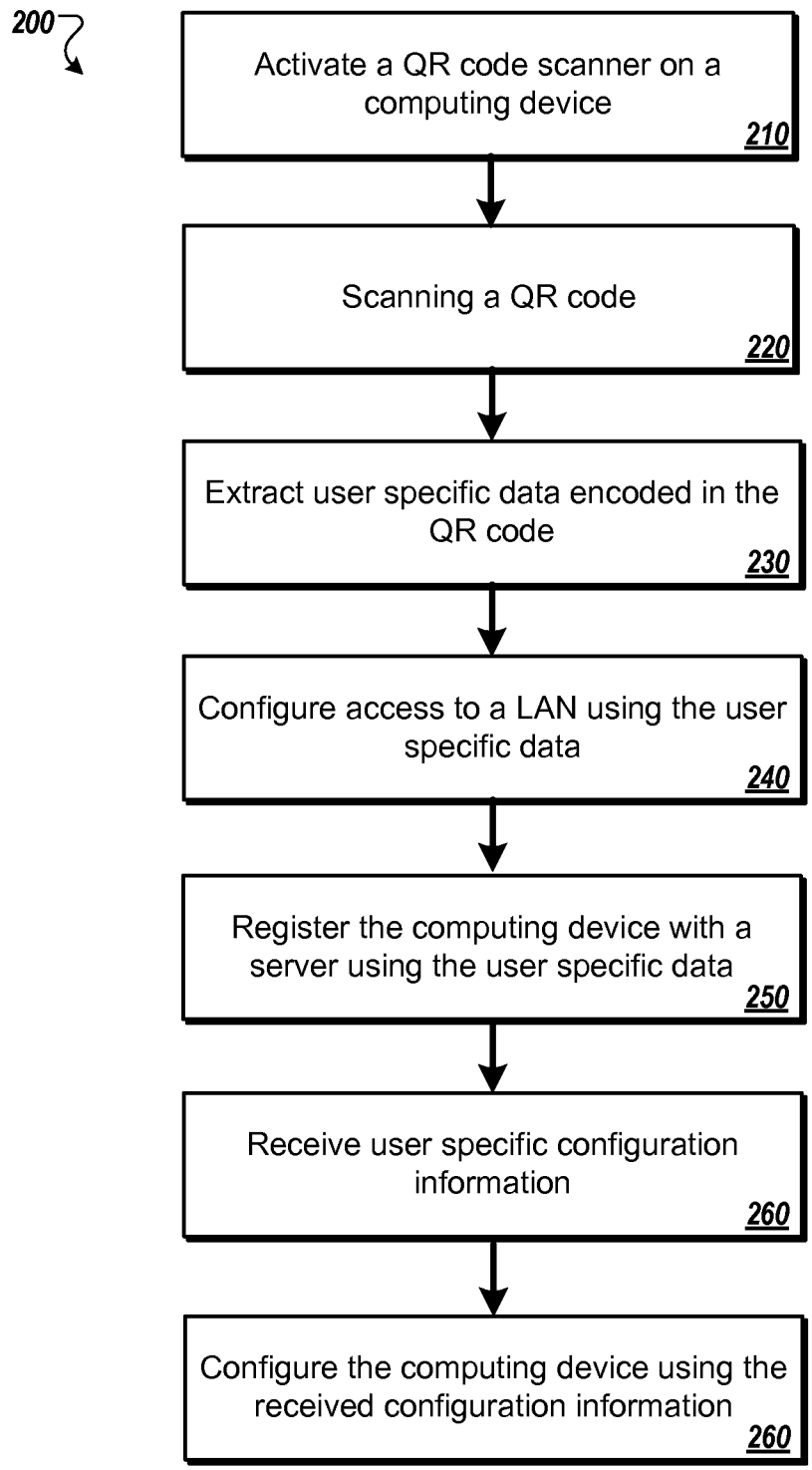
FIG. 2 is a flowchart showing an example of a process for configuring a computing device.

FIG. 2 is a flowchart showing an example of a process 200 for configuring a computing device. Briefly the process 200 includes activating, on a computing device, a Quick Recognition (QR) code scanner when the computing device is powered on, scanning a user specific QR Code® using the QR Code® scanner, extracting, from the scanned QR Code®, user specific data encoded in the QR Code®, configuring the computing device to access a local area network based on the user specific data extracted from the scanned QR Code®, registering, over the local area network, the computing device with a server using the user specific data extracted from the scanned QR Code®, receiving, at the computing device from the server, user specific configuration information, and configuring the computing device using the received configuration information.

In more detail when process 200 begins, a QR Code® scanner is activated on computing device (210) when the computing device is powered on. The QR Code® scanner may be activated in response to the computing device being powered on for the first time or in response to a user choosing to configure the device 105 automatically on a welcome screen.

A user specific QR Code® is scanned using the QR Code® scanner on the computing device (220). User specific data is then extracted from the scanned QR Code® (230). The user specific data is encoded in the QR Code® and may include user information such as the user's first and last name, a username and user password, for example. In some implementations, the username and password may be an e-mail address and e-mail password or 802.1x credentials. The user specific data may also include information to allow the computing device to configure itself for access to a wireless LAN. For example, the information may include a network SSID and network password. Encoding network configuration information, such as a network password, in the QR Code® may allow an organization to provide a user with network access without directly disclosing the network password to the user. Such implementations allow the organization to maintain control of which devices have access to its LAN. In other words, it may prevent a user from accessing the organization's wireless network with his or her personal electronic devices.

Furthermore, in some implementations, the user specific data may be encrypted before it is encoded in the QR Code®. In such implementations, the QR Code® scanner on the computing device decrypts the user specific data after it is decoded. To decrypt the user specific data, the computing device or the QR scanner may have access to a unique decryption key, and employ that unique key to perform the decryption.

The computing device is configured to access a local area network based on the user specific data extracted from the scanned QR Code® (240). The computing device may use the organization's network SSID and password to log into a wireless access point and connect to the organization's LAN. The LAN may provide the computing device with access to a wide area network, such as the internet, for example. Once the computing device has configured access to the wireless LAN, the computing device may save the network settings to access the network at a later time.

The computing device registers with a server using the user specific data extracted from the scanned QR Code®, using the wireless network access (250). Registration may include recording a computing device's unique device identifier, such as a serial number, in association with some or all of a user's user specific data with the device management server. In some implementations, the registration process may also include an authentication step in which the user's identity is verified. For example, authentication may include communicating first with an authentication server and displaying an login page to the user. The user's authentication credentials (i.e. username or e-mail address and password) may, for example, be prefilled, using the user specific data, in the proper location on the login page. Alternatively, a floating application, such as a text box, displaying the login information to the user may be overlaid on the login page, for example. The floating application may be configured to allow the user to copy and paste the login information into the e-mail login page. Upon a successful login, the authentication server may send an indication to another server (e.g. a device management server) that the user's identity has been authenticated. An example indication may be a token. Using the e-mail server to authenticate a user's identify may maintain the user's e-mail account and password privacy because by receiving user authentication form the e-mail server, the device management server would not be provided access to the user's e-mail password.

Other implementations may use a specific username and password to both register the computing device and authenticate the user's identity directly with the device management server. Similar to the process described above, the authentication may be accomplished either by prefilling the required user specific data into a login page for the server or overlaying a floating application display showing the required login information and prompting the user to copy and paste the information into the login page, for example. Additionally, implementations which directly register the computing device with a device management server may, for example, use the user specific data to complete the registration and authentication process transparently; without user interaction. Some implementations may encode a temporary password in the QR Code® and require the user to choose a new password upon registration of the computing device. In this implementation, the QR Code® may be a "one-time-use-only" card. Such an implementation may prevent inadvertent use of the QR Code® by a third party if the card were lost or stolen, for example.

The computing device receives, from the server, user specific configuration information (260). Once the computing device and user are registered with the device management server, the server will identify the appropriate configuration settings and software needed to customize the computing device for the user. For example, the device management server may identify user properties (e.g. first and last name, enrolment information, or school district association) through access to a third-party Student Information System (SIS) integration system, such as Clever. The device management server may then use the identified user properties to tailor the specific configuration information to a particular user. For example, the device management server may use enrollment data to determine which notebooks and electronic textbooks to associate with a student. In addition, the device management server may use school district association information to configure computing device policy settings in accordance with a school district's instructions. In other implementations, the device management server may be configured to access other user information servers or databases provided by the user's organization.

The user specific configuration information may identify electronic textbooks, notebooks, documents, multimedia, or applications required by a user, for example, content related to a student's classes. The configuration information may also include device policy settings requested or required by the user's organization, for instance, a personal identification number (PIN), website restrictions such as parental controls, or other such security or privacy provisions.

The computing device is configured using the received configuration information (270). The computing device may download, from the device management server, internet websites, or other third-party servers, any content specified by the received configuration information. Additionally, the device will configure its system settings in accordance with the received configuration information by adjusting security or privacy settings, for example. In some implementations, the computing device may be preloaded with default user content to reduce the amount of data required to be downloaded during the configuration process. The preloaded content may include any content could possibly be needed by any member of a specific organization or some subset of all such material. For example, content relating to every class taught at a school, across an entire school district, or related to education generally. In such implementations, the configuration information may instruct the device to delete excess content that is not required by a specific user, as opposed to instructions to download required content.

In some implementations, once a computing device and user are registered with the device management server, the computing device may receive updates to its configuration or its user content from the server. The updates may be communicated to the device using a push configuration as the updates become available at the server.

Figure 3:
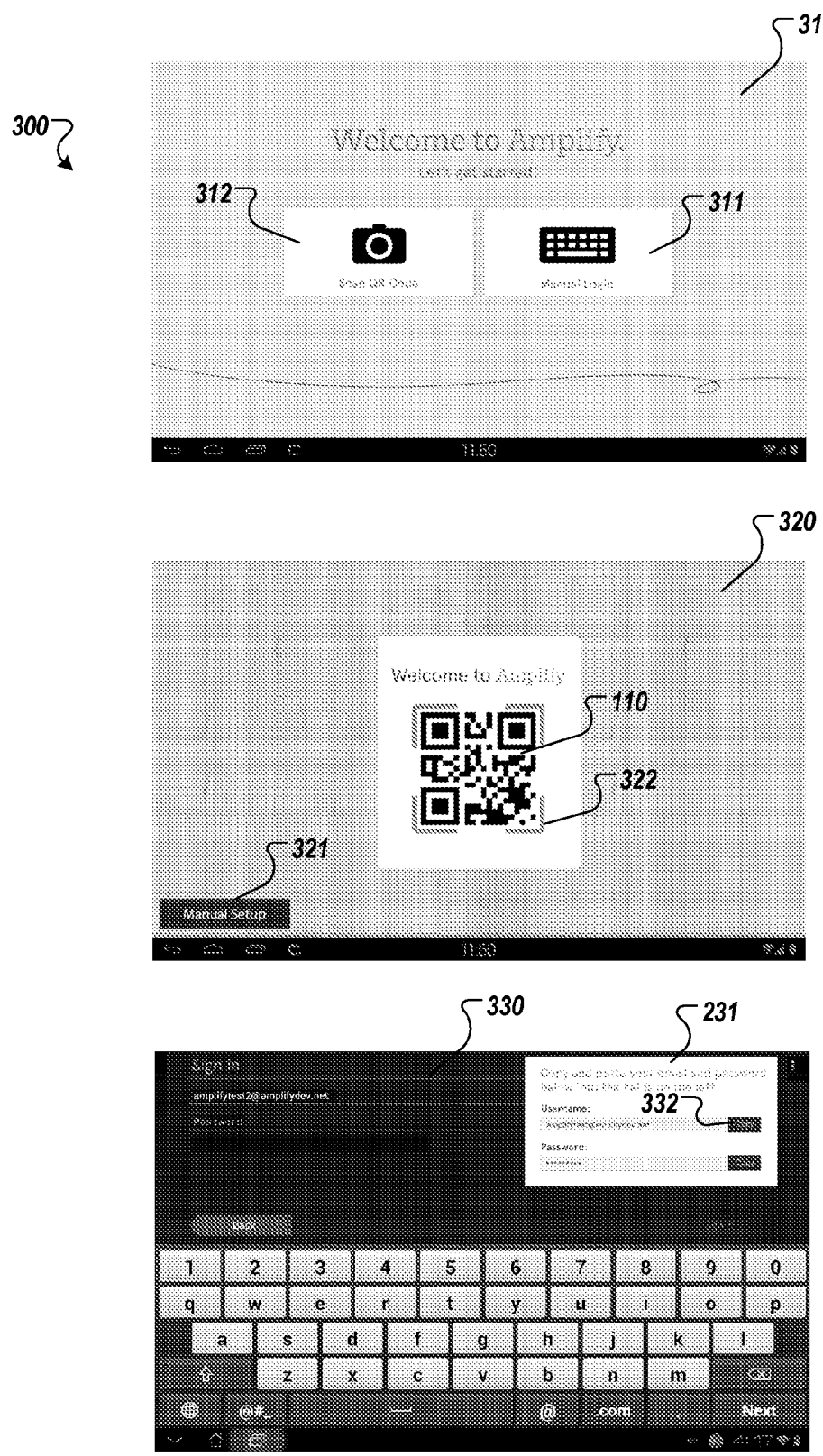
FIG. 3 is a series of illustrations showing examples of screenshots during a configuration process for a computing device.

FIG. 3 is a series of illustrations 300 showing examples of screenshots during a configuration process for a computing device. Briefly, screenshot 310 is an example welcome screen, screenshot 320 is an example QR scanner display, and screenshot 330 is an example login screen. As with the description of FIG. 1, the following description uses a classroom environment as an example application.

Welcome screen 310 relates to state (a) in FIG. 1 and illustrates an example display that a user may see when the computing device is first powered on. Included in the welcome screen 310 are two buttons 311 and 312 displayed on a touchscreen, for example. The buttons 311 and 312 provide the user with the option to configure the device either manually (button 311) or by scanning a QR Code® (button 312). Additionally, the welcome screen 310 may also be displayed when a device is reset to its default settings. For example, a computing device may be reset at the end of a school year to remove the prior student user's information and prepare the computing device to be used by a new student. When the new student powers the reset computing device on, the device will display welcome screen 310 as it did before being configured for the first time.

When a user selects the button 312 to scan a QR Code® a screen such as that shown by screenshot 320 will be displayed, corresponding with state (b) in FIG. 1. In screenshot 320 the computing device activates a QR scanner that activates an installed camera and displays the camera's output. This output may be displayed in the full display screen of the computing device or only a portion thereof; in a window, for example. Screenshot 320 includes a button 321 that allows the user to exit the QR Code® configuration and instead configure the device manually. In addition, screenshot 320 may include alignment marks 322 indicating that a user should align the QR Code® 110 inside the alignment marks 322. Once a QR Code® is aligned with the alignment marks, the QR Code® scanner may automatically scan the QR Code® (that its, the QR scanner may scan the QR Code® without requiring user input).

Screenshot 330, corresponding with state (e) in FIG. 1, depicts a login page for an authentication server and a floating application 331 or text box that displays the user's authentication credentials (e.g. e-mail address and password). The floating application 331 may be configured to remain visible when the user is entering text into the e-mail login page. As depicted, floating application 331 may include copy buttons 332 which allow the user to simply tap the buttons 332 to copy the associated text instead of other common touch screen methods for copying text, such as touch duration.

Figure 4:
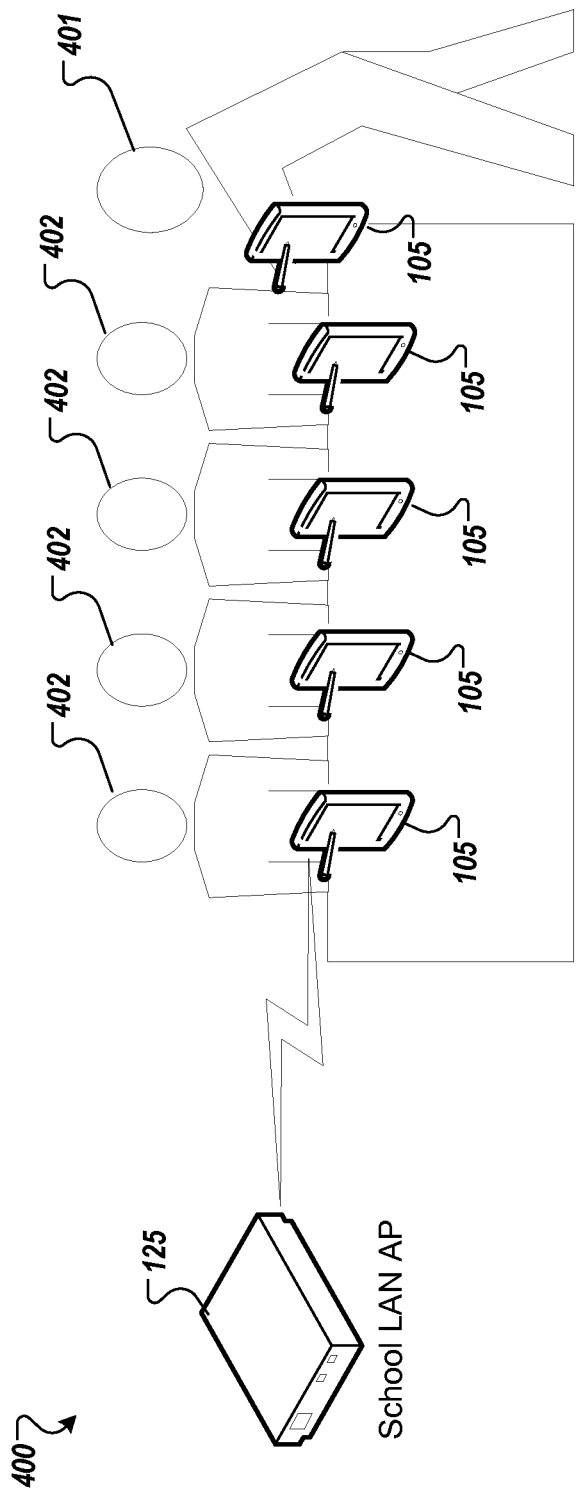
FIG. 4 is a diagram showing an example of an environment in which a configured computing device may be employed.

FIG. 4 is a diagram showing an example of an environment 400 in which a configured computing device may be employed. The diagram depicts a classroom environment including a teacher 401 and students 402. Each student and teacher is provided with a computing device 105. The students' computing devices 105 are uniquely configured with electronic textbooks, notebooks, documents, and multimedia files applicable to their course schedule. The teacher's computing device 105 is configured with similar content based on the courses the teacher teaches. Furthermore, the teacher's computing device 105 is configured with different permission settings from the students' computing devices 105. For example, the teacher's computing device can be configured to allow the teacher to monitor each of the students' computing devices 105, to push additional content to the students' computing devices 105, or to control data displayed on the student's computing devices' 105. For example, the teacher 401 may monitor the class' computing devices 105 for an indication that all of the students present have logged into the schools wireless network. Additionally, the teacher 401 may transmit an electronic quiz to the class and block access to all other functions on the students' computing devices 105 during the quiz, for instance.

In the event that a student 402 forgets to bring his or her computing device to class or loses the device, the teacher 401 can use a QR generating application generate and display the student's QR Code® on the teacher's computing device 105. The student would then be provided with a loaner computing device 105 and scan the displayed QR Code® with the loaner device, thereby quickly retrieving the student's customized content. Any changes the student makes to the electronic textbooks, notebooks or documents may be stored on the device management server and subsequently added to the students own computing device 105 at a later time.

A system to configure a computing device using a user specific QR Code® would be beneficial in an environment such as a school. It would allow students and teachers to easily and efficiently customize the configuration and content of tablet computers for their individual needs. For example, configuration using a QR Code® alleviates the need for complex setup instructions or and minimizes the burden on information technology staff to individually configure computing devices for students and teachers. Using present configurations methods, many schools do not have the staff available to configure and supply each student with a laptop or tablet computer. Rather, students use a computer lab or laptops are brought to a classroom in a cart on a few occasions each week. Not only would a QR Code® configuration system simplify the configuration process for students and alleviate the burden on IT staff, but it may also reduce manufacturing costs. As described above, tablets may be initially loaded with generic content for all school related purposes using a single disk image. The later configuration process then supplements that disk image by instructing the computing device to add or delete content required or not needed by a given student or teacher. Consequently, only a single disk image may be needed to manufacture a tablet computer that could be used in and customized to any student or teacher in the United States. The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components. As another example, while the foregoing describes a QR Code® and QR Code® scanner, other implementations may employ other forms of machine readable tags and appropriate scanners. For instance, other implementations may employ bar codes, other multi-dimensional codes, Radio Frequency Identification (RFID) tags, or Near Field Communication (NFC) tags, together with the appropriate scanning hardware and software. Accordingly, other implementations are within the scope of the following claims.

What is claimed is:

1. A method comprising:
    activating, on a computing device, a Quick Response (QR) scanner, wherein activating the QR code scanner on the computing device is performed to the exclusion of all other applications on the computing device;
    scanning a user specific QR code using the QR code scanner;
    extracting, from the scanned QR code, user specific data encoded in the QR code;
    configuring the computing device to access a local area network based on the user specific data extracted from the scanned QR code;
    registering, over the local area network, the computing device with a server using the user specific data extracted from the scanned QR code;
    receiving, at the computing device from the server, user specific configuration information; and
    configuring the computing device using the received configuration information.

2. The method of claim 1, wherein the user specific data includes at least one of:
    a) a user identifier,
    b) network authentication credentials, or
    c) a user's authentication credentials.

3. The method of claim 1, wherein the computing device is a tablet computer.

4. The method of claim 1, wherein the computing device is programmed to aid in educational instruction.

5. The method of claim 1, wherein configuring the computing device using the received configuration information comprises removing, from the computing device, content that was loaded on the computing device prior to scanning the QR code, the content removed being determined from the received user specific configuration information.

6. The method of claim 1, wherein configuring the computing device using the received configuration information comprises loading content on the computing device, the content being determined from the received user specific configuration information.

7. The method of claim 1, wherein configuring the computing device using the received configuration information comprises setting policies on the computing device based on the received user specific configuration information.

8. The method of claim 1, further comprising:
    accessing user specific data for a plurality of users;
    selecting the user specific data associated with an individual user from the plurality of users; and
    generating the user specific QR code encoding the user specific data for the individual user.

9. The method of claim 1, further comprising printing the QR code on a card and distributing the printed card with the computing device to the individual user.

10. The method of claim 1, further comprising:
    generating, by a second computing device, the QR code encoding the user specific data;
    displaying, on a display of the second computing device, the QR code; and
    wherein scanning the QR code comprises scanning the QR code displayed on the display of the second computing device using the QR scanner.

11. A non-transitory computer-readable storage medium storing instructions that, when executed by one or more processing devices, cause the processing devices to perform operations comprising:
    activating, on a computing device, a Quick Response (QR) scanner, wherein activating the QR code scanner on the computing device is performed to the exclusion of all other applications on the computing device;
    scanning a user specific QR code using the QR code scanner;
    extracting, from the scanned QR code, user specific data encoded in the QR code;
    configuring the computing device to access a local area network based on the user specific data extracted from the scanned QR code;
    registering, over the local area network, the computing device with a server using the user specific data extracted from the scanned QR code;
    receiving, at the computing device from the server, user specific configuration information; and
    configuring the computing device using the received configuration information.

12. The non-transitory computer-readable storage medium of claim 11, wherein the user specific data includes at least one of:
   a) a user identifier,
   b) network authentication credentials, or
   c) a user's authentication credentials.

13. The non-transitory computer-readable storage medium of claim 11, wherein the computing device is a tablet computer.

14. The non-transitory computer-readable storage medium of claim 11, wherein the computing device is programmed to aid in educational instruction.

15. The non-transitory computer-readable storage medium of claim 11, wherein configuring the computing device using the received configuration information comprises removing, from the computing device, content that was loaded on the computing device prior to scanning the QR code, the content removed being determined from the received user specific configuration information.

16. The non-transitory computer-readable storage medium of claim 11, wherein configuring the computing device using the received configuration information comprises loading content on the computing device, the content being determined from the received user specific configuration information.

17. The non-transitory computer-readable storage medium of claim 11, wherein configuring the computing device using the received configuration information comprises setting policies on the computing device based on the received user specific configuration information.

18. The non-transitory computer-readable storage medium of claim 11, the operations further comprising:
   accessing user specific data for a plurality of users;
   selecting the user specific data associated with an individual user from the plurality of users; and
      generating the user specific QR code encoding the user specific data for the individual user.

19. The non-transitory computer-readable storage medium of claim 11, the operations further comprising printing the QR code on a card and distributing the printed card with the computing device to the individual user.

20. The non-transitory computer-readable storage medium of claim 11, the operations further comprising:
   generating, by a second computing device, the QR code encoding the user specific data;
   displaying, on a display of the second computing device, the QR code; and
   wherein scanning the QR code comprises scanning the QR code displayed on the display of the second computing device using the QR scanner.

21. A method comprising:
   activating, on a computing device, a Quick Response (QR) code scanner;
   scanning a user specific QR code using the QR code scanner;
   extracting, from the scanned QR code, user specific data encoded in the QR code;
   configuring the computing device to access a local area network based on the user specific data extracted from the scanned QR code;
   registering, over the local area network, the computing device with a server using the user specific data extracted from the scanned QR code, the registering including:
   displaying, on the computing device, a user login page;
      displaying, in a separate panel overlaid on the login page a username and password,
      prompting the user to copy the username and password into the user login page,
      sending the entered username and password to an authentication server,
      receiving, from the authentication server, a token, the token indicating the user's username and password were authenticated by the authentication server, and
      associating the computing device with user specific configuration information for the user;
   receiving, at the computing device from the server, user specific configuration information; and
   configuring the computing device using the received configuration information.

22. The method of claim 21, wherein the user specific data includes at least one of:
   a) a user identifier,
   b) network authentication credentials, or
   c) a user's authentication credentials.

23. The method of claim 21, wherein configuring the computing device using the received configuration information comprises removing, from the computing device, content that was loaded on the computing device prior to scanning the QR code, the content removed being determined from the received user specific configuration information.

24. The method of claim 21, wherein configuring the computing device using the received configuration information comprises loading content on the computing device, the content being determined from the received user specific configuration information.

25. The method of claim 21, wherein configuring the computing device using the received configuration information comprises setting policies on the computing device based on the received user specific configuration information.

26. A non-transitory computer-readable storage medium storing instructions that, when executed by one or more processing devices, cause the processing devices to perform operations comprising:
   activating, on a computing device, a Quick Response (QR) code scanner;
   scanning a user specific QR code using the QR code scanner;
   extracting, from the scanned QR code, user specific data encoded in the QR code;
   configuring the computing device to access a local area network based on the user specific data extracted from the scanned QR code;
   registering, over the local area network, the computing device with a server using the user specific data extracted from the scanned QR code, the registering including:
   displaying, on the computing device, a user login page;
      displaying, in a separate panel overlaid on the login page a username and password,
      prompting the user to copy the username and password into the user login page,
      sending the entered username and password to an authentication server,
      receiving, from the authentication server, a token, the token indicating the user's username and password were authenticated by the authentication server, and
      associating the computing device with user specific configuration information for the user;
   receiving, at the computing device from the server, user specific configuration information; and
   configuring the computing device using the received configuration information.

27. The non-transitory computer-readable storage medium of claim 26, wherein the user specific data includes at least one of:
- a) a user identifier,
- b) network authentication credentials, or
- c) a user's authentication credentials.

28. The non-transitory computer-readable storage medium of claim 26, wherein configuring the computing device using the received configuration information comprises removing, from the computing device, content that was loaded on the computing device prior to scanning the QR code, the content removed being determined from the received user specific configuration information.

29. The non-transitory computer-readable storage medium of claim 26, wherein configuring the computing device using the received configuration information comprises loading content on the computing device, the content being determined from the received user specific configuration information.

30. The non-transitory computer-readable storage medium of claim 26, wherein configuring the computing device using the received configuration information comprises setting policies on the computing device based on the received user specific configuration information.

* * * * *